United States Patent [19] [11] Patent Number: 4,946,590
Hertzog [45] Date of Patent: Aug. 7, 1990

[54] CLAMP-ON MAGNETIC WATER TREATMENT DEVICE

[75] Inventor: Arthur A. Hertzog, Whitehall, Pa.

[73] Assignee: Fluid Care Industries, Inc., Whitehall, Pa.

[21] Appl. No.: 336,735

[22] Filed: Apr. 12, 1989

[51] Int. Cl.$^5$ .............................................. C02F 1/48
[52] U.S. Cl. ..................................... 210/222; 210/232
[58] Field of Search ............... 210/222, 223, 232, 695; 55/100

[56] References Cited

U.S. PATENT DOCUMENTS

| | | | |
|---|---|---|---|
| 2,939,830 | 6/1960 | Green et al. | 210/222 |
| 3,228,878 | 1/1966 | Moody | 210/222 |
| 3,719,583 | 3/1973 | Ustick | 210/222 |
| 4,188,296 | 2/1980 | Fujita | 210/222 |
| 4,229,389 | 10/1980 | Granger | 210/223 |
| 4,367,143 | 1/1983 | Carpenter | 210/222 |
| 4,711,271 | 12/1987 | Weisenbarger et al. | 210/222 |

FOREIGN PATENT DOCUMENTS 1212969  2/1989  U.S.S.R. ............................. 210/222

*Primary Examiner*—W. Gary Jones
*Assistant Examiner*—Matthew Savage
*Attorney, Agent, or Firm*—Steele, Gould & Fried

[57] ABSTRACT

A clamp-on magnetic water treatment device for minimizing hard precipitate scale and lime deposit in a fluid supply, especially a domestic water system, has a magnet array having two sections which clamp together over a non-ferromagnetic section of conduit in the water system. The array of magnets defines at least two pairs of magnetic poles of opposite polarity across the flow path for the water, whereby a magnetic field is produced defining flux lines directly perpendicular to the flow path, and the magnets in the array attract one another across the flow path. The magnets in the array also define magnetic poles of opposite polarity proceeding downstream along the flow path. However, the individual magnets in the array are all arranged such that their poles are directed toward and away from the conduit, and not longitudinally along the flow path. In this manner, the maximum field strength is obtained in a clamp-on device. An outer enclosure of ferromagnetic material confines lines of flux to high permeability materials, maximizing flux density at the area of the fluid flowing in the conduit.

14 Claims, 2 Drawing Sheets

CLAMP-ON MAGNETIC WATER TREATMENT DEVICE

BACKGROUND OF THE INVENTION

1. Field of the Invention

This invention relates to the field of electromagnetic fluid treatment devices for decreasing accumulation of hard scale, lime and similar deposits via electromagnetic agitation of mineral ions in fluid supply conduits. The invention relates more particularly to a clamp-on magnetic device using a specific magnet array and housing.

2. Prior Art

Numerous attempts have been made to treat water and other fluids by means of electric and magnetic interactions with the fluid. Dissolved mineral deposits in a water supply appear as free ions (charged particles), which can be moved electromagnetically. Electrostatic forces can separate ions by their charge. Flow of ions along the fluid flow path defines a current, making it also possible to affect the mobility of ions in the fluid magnetically. The Hall effect, for example, will cause a transverse force to act on moving charges subjected to a magnetic field. This force can be applied using a non-varying magnetic field, for example from permanent magnets, to agitate ions moving along the flow path.

Agitating ions, per se, does not make the ions unavailable for the chemical reactions which result in precipitation of lime and scale. However, in practice, it has been determined by various persons in the art that the character of the precipitation of lime and scale deposits, such as calcium carbonate in domestic water supplies, can be altered with beneficial results, using electric and magnetic fields. In particular, when magnetic fields are applied to a flow of ion-containing fluid, agitation of the ions causes the inevitable precipitate to be more sludge-like, loosely associated and less capable of forming the type of hard scale precipitate accumulations which adversely affect the flow path. Adverse effects of hard scale are due to their clinging nature, not due to their existence, per se. Problems include reduction of the internal diameter of the conduit, decrease in thermal conductivity of the conduit, and the like. These problems do not occur where the precipitate does not become fixed in a scaly accumulation and instead is flushed along with the flow.

The foregoing beneficial effects of magnetic treatment are known in the prior art. However, the particular means for producing the required fields and the field strengths have typically been both overly complicated and incapable of producing the required high magnetic flux density needed to render the device operable and practical. One group of devices for water treatment is characterized by complex housings and flow path-defining elements which must be inserted in-line along the flow path, i.e., by removing a section of conduit, and installing a plumbed-in fixture. While it may be possible with such a device to achieve adequate flux density, as a practical matter, the device is too complicated.

Moody U.S. Pat. No. 3,228,878 discloses a water treatment device wherein a plurality of permanent magnets are clamped on a conduit to define a zone subjected to a stable magnetic field. In this patent, the magnets are bar magnets in an arched configuration, a plurality of such magnets being attached such that all the magnets have their south poles at the same place along the flow-path, i.e., around one circumferential position along the conduit, and all the north poles are likewise together, at a circumferential position downstream of the south poles. Such a device would seem to be a straightforward solution to the problem of applying a magnetic field to a conduit. However, by placing all the like poles of the magnets together, a null is produced, particularly centrally in the conduit, wherein the flux density is at a minimum.

Another drawback to the prior art structure of Moody, and other devices characterized by a group of similar poles placed together, occurs because the flux density of a magnetic field is most concentrated through material of maximum magnetic permeability between the opposite magnetic poles, while the lines of flux diverge in low-permeability areas, e.g., air gaps between the poles. The energy associated with the magnetic field in Moody tends to reside in the relatively long gap between the successively-placed opposite poles, where the lines of flux diverge, rather than across the shorter gap defined transversely across the fluid conduit. Therefore, the type of device as disclosed in Moody '878 is insufficient because an unnecessarily long gap is left between opposite magnetic poles.

Green et al U.S. Pat. No. 2,939,830 teaches a device wherein a magnetic pole piece extends internally. Electric means are provided for energizing the pole piece using an alternating current. While it is possible to minimize the low permeability gap in a water treatment device by providing internal high permeability structures for confining magnetic flux lines, this is an unacceptable solution because devices of this type must inherently be attached in-line in the conduit, i.e., the fixture must be plumbed-in.

In another class of devices, a plurality of semicircular annular magnets are placed on a conduit means. In Granger U.S. Pat. No. 4,229,389, an in-line device employs such magnets, in an alternating-pole arrangement.

Carpenter Pat. No. 4,367,143 discloses a clamp-on device having a plurality of permanent magnets with means for clamping the magnets to the outside of a section of conduit. This device, like the Moody device, places like poles across from one another in the direction transverse to the flow path. Moreover, the Carpenter device employs three magnets at 120 degree interval Fujita Pat. No. 4,188,296 discloses a magnet treatment device wherein the lines of flux pass transversely through a conduit. However, there is no reversal of polarity proceeding along the flow path. Hall effect forces on ions in fluid passing along the conduit will not be reversed. The effect of the device is therefore simply to induce eddies at one point along the flow path.

Each of the foregoing patent disclosures is incorporated for teachings related to magnetic water treatment. The present invention, however, is directed to improving such devices by increasing the agitation of calcareous water ions in a device which is minimally intrusive of the fluid conduit system. This is accomplished using an array of magnets which is self-clamping, i.e., having opposite magnetic poles facing one another transversely across the flow path defined by the conduit. Individual permanent magnets in the array are polarized in a direction oriented toward and away from the conduit, and not along a direction parallel to the longitudinal axis of the conduit. Downstream from a first array of at least two magnets having opposite poles facing across the conduit, is a second array having a similar configuration, but reversed in direction from the first array.

The invention also includes a housing element of ferrous material which bridges the poles of the magnetic array which face diametrically away from the conduit. Because the housing is a high permeability material, substantially all the magnetic energy is concentrated in a transverse magnetic field perpendicular to the fluid flow path through the conduit. It is therefore possible with relatively inexpensive permanent magnets to achieve a high flux density and to produce sufficient agitation to have a beneficial effect, even at the relatively low velocity of fluid moving in the flow path of a typical domestic water supply.

SUMMARY OF THE INVENTION

It is an object of the invention to provide a clamp-on magnetic fluid treatment device, especially for domestic water supplies, which is inexpensive and effective to minimize accumulation of hard scale deposits.

It is another object of the invention to confine the magnetic field of a water treatment device such that the available energy in the magnetic field is concentrated at least at two successive transverse fields of reverse polarity along the flow path.

It is another object of the invention to provide a device wherein the field strength readily can be adjusted as appropriate for accommodating expected flow rates, by stacking magnets.

These and other objects are accomplished by a clamp-on magnetic water treatment device for minimizing hard precipitate scale and lime deposit in a fluid supply, especially a domestic water system. The device has a magnet array having two sections which clamp together over a non-ferromagnetic section of conduit in the water system. The array of magnets defines at least two pairs of magnetic poles of opposite polarity across the flow path for the water, whereby a magnetic field is produced defining flux lines directly perpendicular to the flow path, and the magnets in the array attract one another across the flow path. The magnets in the array also define magnetic poles of opposite polarity proceeding downstream along the flow path. However, the individual magnets in the array are all arranged such that their poles are directed toward and away from the conduit, and not longitudinally along the flow path. In this manner, the maximum field strength is obtained in a clamp-on device. An outer enclosure of ferromagnetic material confines lines of flux to high permeability materials, maximizing flux density at the area of the fluid flowing in the conduit.

BRIEF DESCRIPTION OF THE DRAWINGS

There are shown in the drawings the embodiments that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
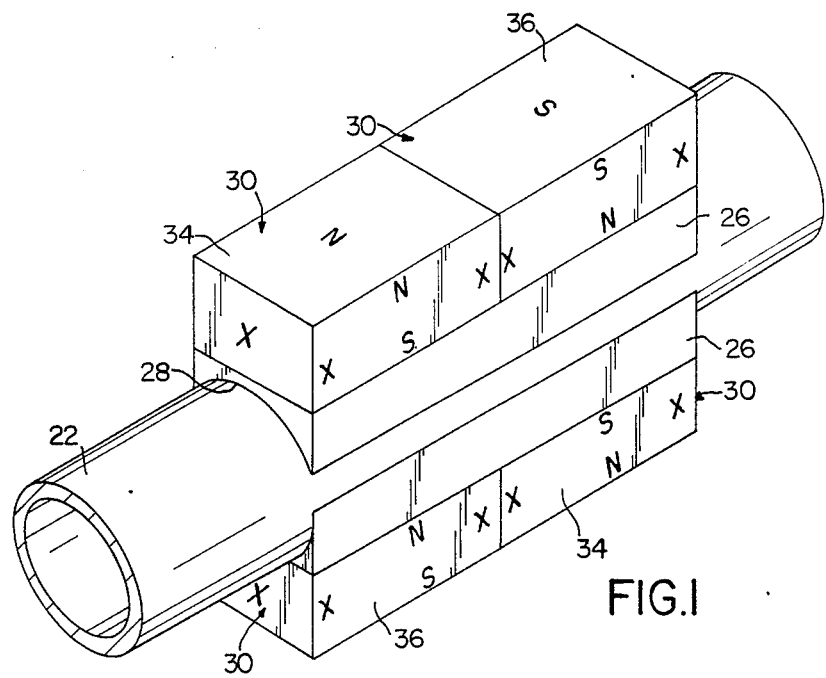
FIG. 1 is a perspective view of a water treatment device according to the invention.

As shown in FIG. 1, the water treatment device of the invention includes a plurality of magnets 30 positioned on the outside of a conduit 22 such that the respective poles of the magnets define a magnetic field of a first polarity transverse to the direction of flow, followed in short succession by a similar transverse magnetic field of opposite polarity, immediately downstream of the first field. In the embodiment of FIG. 1, the north poles 34 are designated "N" and the south poles are designated "S". The areas designated "X" are non-polarized, i.e., these areas are not north or south poles. In the embodiment shown, the magnets are polarized only in a direction toward and away from conduit 22, and not in a direction parallel to the longitudinal axis of conduit 22. Therefore, the two successive magnets 30 on one side of the conduit do not equate with a bar magnet having its poles located in succession along a line parallel with the axis of conduit 22. Instead, the magnets are individual arrays, which along their longitudinal axes do not produce a polar difference.

The magnets 30 can be carried on a support 26, whereby they are positioned diametrically opposite on conduit 22. Conduit 22 can of course be any cross sectional shape, however, round cross sectional pipes are the most common in fluid supply systems. Typically, conduit 22 in a water supply system is a copper pipe of ½ inch, ⅝ inch or ¾ inch diameter. They can also be other sizes. Copper being non-ferromagnetic, the lines of flux produced by magnets 30 pass directly through conduit 22, whereby the magnets on diametrically opposite sides of the conduit simply attract one another and remain in position when placed there.

The individual magnets 30 can be magnetized iron, ceramic or other magnetic materials, i.e., having a relatively high magnetic permeability and exhibiting hysteresis. In order to achieve appropriate field strengths in a typical water system, it is normally desirable to have a magnet which can produce a field of at least 4000 gauss at the pole surface. Such a strength is adequate in typical water supply systems, wherein the flow is on the range of one foot per second or greater.

In the embodiment of FIG. 1, the facing poles diametrically across the conduit are at a minimum distance. The field strength in the conduit is therefore high. Lines of flux, however, also extend from the poles which face outwardly, to bridge between the opposite poles around the outside of the device. This flux density is not controlled in FIG. 1. According to the embodiment of FIG. 2, a ferromagnetic outer housing 50 is provided, the housing providing a high permeability path for confining the lines of flux to the housing, which is a magnetically permeable material. Housing 50 has flat bottom sections 52, which rest against the outer pole faces of magnets 30, and hold them in place. Where housing 50 is included, the magnets need not be provided with a contoured support 26, because the housing will hold the magnets 30 in position in lieu of the contoured face 28 of supports 26. It is also possible to have a concave surface on the magnets themselves.

Figure 2:
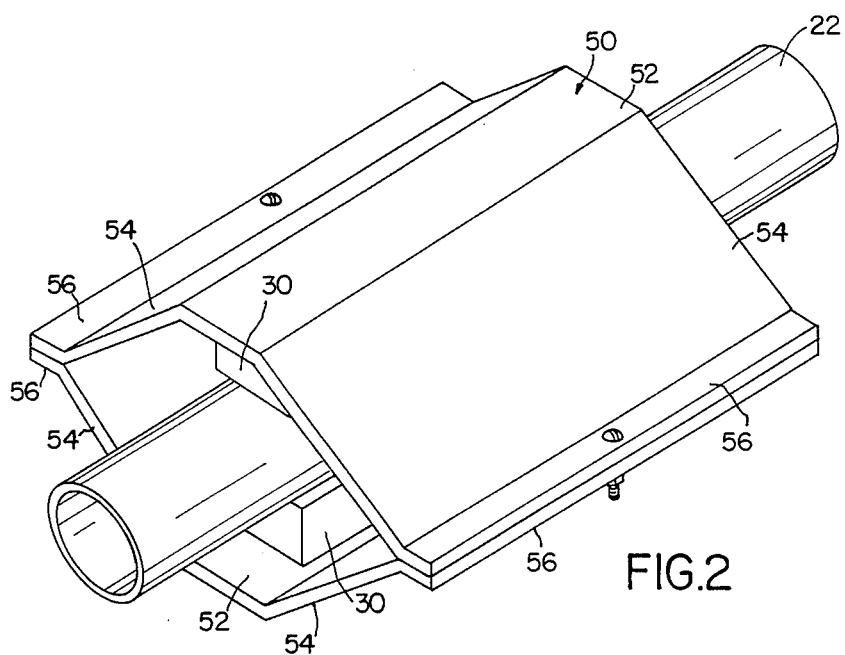
FIG. 2 is a perspective view of the water treatment device, including the ferromagnetic housing.

The housing is defined by facing channel sections having flat bottoms 52 resting against magnets 30, wings 54 extending diagonally outward from the conduit at an obtuse angle from the bottoms, and terminal flanges 56. The wings can extend from the bottoms at an obtuse angle, as shown, which has the effect of spacing the flanges 56 from the conduit. The terminal flanges 56 contact along a surface oriented radially of the conduit, i.e., in a plane common to the longitudinal axis of the conduit, thereby avoiding an air gap while supporting the housing halves against one another, and holding the magnets in aligned and opposed position. Housing 50 is preferably steel sheet, and can be coated to reduce corrosion problems. While the housing halves will normally remain attached to one another by the magnetic attraction produced by magnets 30, it is also possible to more permanently attach them using screws, rivets or the like as shown in FIG. 2.

Figure 3:
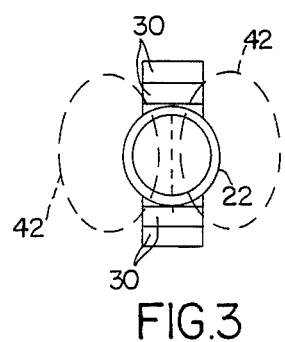
FIG. 3 is a schematic illustration showing flux lines of the magnetic field.

FIG. 3 illustrates the lines of flux expected in a configuration according to FIG. 1. Flux lines 42 pass transversely across the flow path between magnets 30, and also outwardly through the air. The housing 50 of FIG. 2 confines the lines of flux which diverge outwardly to highly-permeable material, thereby conserving power in that the flux density produced by the magnets 30 is substantially all directed to the low-permeability gap between magnets 30, i.e., to the area within the conduit 22.

Figure 4:
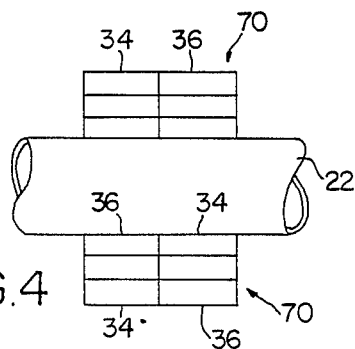
FIGS. 4, 5, and 7 are elevation views showing alternative magnet arrays.
Figure 7:
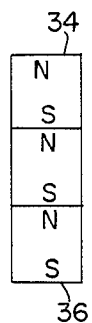

At least one reversal in magnetic polarity is encountered by ions moving along the flow path. As shown in FIG. 4, the flux density of the fields can be increased by stacking magnets 30. When stacking magnets, as illustrated in FIG. 7, the north pole 34 and south pole 36 are defined at the stack top and bottom, regardless of how many individual magnets are abutted at opposite poles. Of course, the opposite poles attract one another and keep the magnets in the required position FIG. 4 illustrates a stack of three magnets on each opposite side of conduit 22, and one polarity reversal along the flow path.

Figure 5:
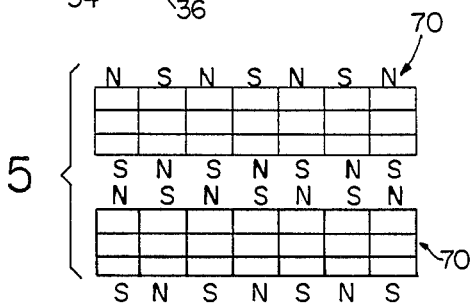

Another array 70 of magnets is shown in FIG. 5. I this case, the stack of three magnets is provided and a plurality of north/south reversals are encountered along the flow path. A configuration as in FIG. 5 may be appropriate where an especially high flow rate or a large ion concentration is expected.

Figure 6:
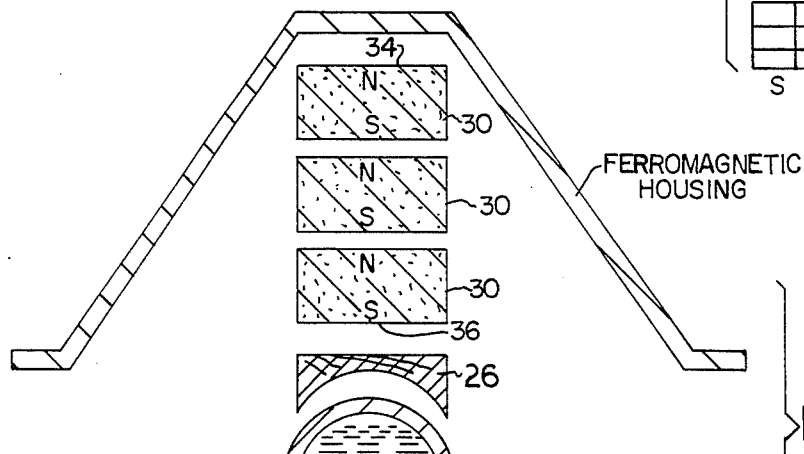
FIG. 6 is a partially exploded section view taken along the axis of the device, and showing a preferred embodiment.
Figure 6:
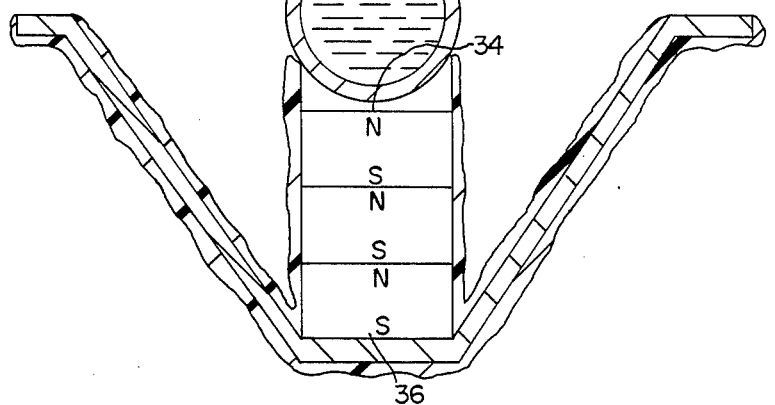

FIG. 6 illustrates a preferred embodiment, wherein three magnets 30 are stacked, provided with a non-ferromagnetic support 26, and carried within housing 50, as shown in FIG. 2. As also shown in FIG. 6, the magnets, housing and support are preferably encapsulated in a plastic material to prevent corrosion. FIG. 6 is partially exploded, and shows the configuration of magnetic poles.

Support 26 is preferably a wood or plastic device, but can be a magnetically-permeable material. At the radial position centrally aligned with the poles 34, 36 of magnets 30, the support 26 should be of minimum thickness.

Ions passing along the flow path defined within conduit 22 are subjected to a magnetic field having lines of flux passing transversely through the flow path. As a result of the Hall effect, the ions, which define a current by virtue of their motion, are subjected to a transverse force. This force causes the ions to seek to move in a spiral, producing a relative motion between the ions and the neutral molecules of water or other fluid passing along the conduit. It is unclear whether the agitation facilitates chemical reactions leading to precipitation, or tends to interfere with such reactions. Experiments have nevertheless shown that, in practice, hard scale deposits do not accumulate at a rate they otherwise would accumulate. Precipitation of ions from the calcareous fluid is formed as a sludge or slurry rather than as clinging hard scale and lime deposits that coat the conduit walls.

The invention as disclosed is a fluid treatment device for minimizing accumulation of hard precipitate deposits in a fluid delivery system having at least one conduit 22 for carrying the fluid along a flowpath, the device comprising a non-ferromagnetic section along the conduit, having a low magnetic permeability, an array of magnets 30, 70 disposed adjacent a surface of the conduit at the non-ferromagnetic section, the array of magnets defining at least two pairs of magnetic poles 34, 36 of opposite polarity across the flowpath, whereby a magnetic field is produced directly perpendicular to the flowpath and magnets 30 in the array 70 attract one another across the flowpath, magnets in the array also defining magnetic poles 34, 36 of opposite polarity proceeding downstream along the flowpath, whereby a charged particle moving along the flowpath is subjected to alternating Hall effect forces, tending to agitate the charged particle and interfere with hard scale precipitation. The array 70 of magnets can include at least four permanent magnets, each of the magnets defining a first magnetic pole directed toward the non-ferromagnetic conduit section 22 and an opposite magnetic pole directed away from the non-ferromagnetic conduit, poles of successive ones of the bar magnets on a same side of the non-ferromagnetic conduit being at opposite polarities proceeding along the flowpath. The magnets individually are nonpolar in a direction parallel to the flowpath and are polar in a direction transverse to the flowpath.

The magnets are preferably bar magnets 30 and have a longer dimension parallel to the flowpath and a shorter dimension aligned perpendicular to the flowpath. However, the bar magnets are polarized such that their poles are located on surfaces along the longer dimension, i.e., facing radially inward or outward.

A non-ferromagnetic support 26 can be provided for said magnets 30, the support 26 having a contour 28 complementary to at least one of the magnets 30 and the non-ferromagnetic conduit 22.

A housing 50 for the magnets is relatively more magnetically permeable than the non-ferromagnetic conduit 22 and defines a magnetic flux path enclosing around the conduit and bridging between outward facing opposite poles 34, 36 of the magnets.

The non-ferromagnetic conduit 22 can be a length of domestic copper pipe to which the fluid treatment device is clamped externally by attraction of the magnets 30.

The housing 50 has two substantially semi-cylindrical halves, each said half being magnetically attracted to a pair of said magnets on a respective side of the conduit, and the two halves being magnetically attracted to one another at facing edges, for example flanges 56 extending radially and parallel to the flowpath. The halves are disposed alongside one another and can rest against one another at the flanges 56, avoiding an air gap.

The magnets preferably have a flux density of at least 4,000 gauss at a pole face thereof.

The device of the invention is more particularly characterized as clamp-on fluid treatment device for minimizing hard lime and scale deposits in a water supply system having at least one conduit 22 for carrying the water along a flowpath, with a non-ferromagnetic section along the conduit 22, having a low magnetic permeability an array 70 of at least four permanent bar magnets 30 disposed on a surface of the conduit 22 at the non-ferromagnetic section, the array of bar magnets 30 defining at least two pairs of magnetic poles 34, 36 of opposite polarity across the flowpath, whereby a magnetic field is produced directly perpendicular to the flowpath and magnets 30 in the array 70 attract one another across the flowpath, magnets in the array also defining magnetic poles of opposite polarity proceeding downstream along the flowpath, each of the bar magnets defining a magnetic pole directed toward the non-ferromagnetic conduit and an opposite magnetic pole directed away from the non-ferromagnetic conduit, the bar magnets 30 individually being nonpolar in a direction parallel to the flowpath, poles of successive ones of the bar magnets on a same side of the non-ferromagnetic conduit being at opposite polarities proceeding along the flowpath, whereby a charged particle moving along the flowpath is subjected to alternating Hall effect forces, tending to agitate the charged particle and interfere with hard lime and scale precipitation.

I claim:

1. A fluid treatment device for minimizing accumulation of hard precipitate deposits in a fluid delivery system having at least one conduit for carrying the fluid along a flowpath, the conduit having at least a section along its length which is non-ferromagnetic around its circumference and characterized by a low magnetic permeability, the device comprising:

an array of magnets disposed adjacent a surface of the conduit at the non-ferromagnetic section, the array of magnets defining at least two pairs of magnetic poles of opposite polarity across the flowpath, whereby a magnetic field is produced directly perpendicular to the flowpath and magnets in the array attract one another across the flowpath, magnets in the array also defining magnetic poles of opposite polarity proceeding downstream along the flowpath, whereby a charged particle moving along the flowpath is subjected to alternating Hall Effect forces, tending to agitate the charged particle and interfere with hard scale precipitation; and, a housing enclosing the magnets and the non-ferromagnetic section of the conduit, the housing being of high magnetic permeability and having two substantially semi-cylindrical halves, each said half being magnetically attracted to a pair of said magnets on a respective side of the conduit, and the two halves being magnetically attracted to one another at facing edges thereof by magnetic flux substantially confined to the halves of the housing, the halves of the housing having flanges extending radially of the non-ferromagnetic section at said facing edges, the halves being supported against one another by contact at the flanges.

2. The fluid treatment device of claim 1, wherein the array of magnets includes at least four permanent magnets, each of the magnets defining a first magnetic pole directed toward the non-ferromagnetic section of the conduit and an opposite magnetic pole directed away from the non-ferromagnetic section of the conduit and toward one of said halves of the housing, poles of successive ones of the bar magnets on a same side of the non-ferromagnetic section of the conduit being at opposite polarities proceeding along the flowpath, magnetic flux lines produced by all said at least four magnets being substantially confined to one of the housing and the non-ferromagnetic section of the conduit.

3. The fluid treatment device of claim 2, wherein the magnets individually are nonpolar in a direction transverse to the flowpath.

4. The fluid treatment device of claim 3, wherein the magnets are bar magnets and have a longer dimension parallel to the flowpath and a shorter dimension aligned perpendicular to the flowpath, the bar magnets being polarized such that their poles are located on surfaces along the longer dimension.

5. The fluid treatment device of claim 1, further comprising a non-ferromagnetic support for said magnets, the support having a contour complementary to at least one of the magnets and the non-ferromagnetic section of the conduit.

6. The fluid treatment device of claim 5, wherein the conduit is domestic copper pipe at least at the non-ferromagnetic section and the fluid treatment device is clamped externally on the pipe by attraction of the magnets.

7. The fluid treatment device of claim 1, wherein the housing for the magnets is a ferrous metal, and the halves in cross-section define a flat bottom section disposed against the magnets, wings extending outwardly from the bottom section, and terminal flanges on the wings, the flanges of the wings of said two halves resting against one another in surface contact along a plane including a longitudinal axis of the non-ferromagnetic section of the conduit.

8. The fluid treatment device of claim 7, wherein the non-ferromagnetic section of the conduit is a length of domestic copper pipe included in the conduit and the fluid treatment device is clamped externally on the pipe by attraction of the magnets.

9. The fluid treatment device of claim 7, wherein the wings of the housing halves extend outwardly at an obtuse angle relative to the bottom section, whereby the flanges on the wings are spaced from the non-ferromagnetic section of the conduit.

10. The fluid treatment device of claim 1, wherein the conduit at least at the non-ferromagnetic section is domestic copper water pipe and the magnets are clamped externally thereto, the magnets having a flux density of at least 4,000 gauss at a pole face thereof.

11. A clamp-on fluid treatment device for minimizing accumulation of hard lime and scale deposits in a water supply system having at least one conduit for carrying the water along a flowpath, the conduit having at least a section along its length which is non-ferromagnetic around its circumference and characterized by low magnetic permeability, the device comprising:

an array of at least four permanent bar magnets to be mounted on a surface of the conduit at the non-ferromagnetic section, the array of bar magnets abutting one another longitudinally of the conduit and defining at least two pairs of magnetic poles of opposite polarity across the flowpath, whereby a magnetic field is produced directly perpendicular to the flowpath and magnets in the array attract one another across the flowpath, magnets in the array also defining magnetic poles of opposite polarity proceeding downstream along the flowpath, each of the bar magnets defining a magnetic pole directed toward the non-ferromagnetic section of the conduit and an opposite magnetic pole directed away from the non-ferromagnetic section, the bar magnets individually being nonpolar in a direction parallel to the flowpath, poles of successive ones of the bar magnets on a same side of the non-ferromagnetic conduit being at opposite polarities proceeding along the flowpath, whereby a charged particle moving along the flowpath is subjected to alternating Hall Effect forces, tending to agitate the charged particle and interfere with hard lime and scale precipitation; and a housing for the magnets, the housing being magnetically permeable and defining a magnetic flux path encircling the conduit and bridging between outward facing opposite poles of the magnets, the housing having two substantially semi-cylindrical halves, each said half having a bottom section magnetically attracted to a pair of said magnets on a respective side of the pipe, the magnets being disposed between the bottom section and the non-ferromagnetic section, the housing having wings extending outwardly from the bottom section and from the non-ferromagnetic section of the conduit, the wings defining supporting flanges at which the two halves of the housing are supported in contact along a plane including a longitudinal axis of the non-ferromagnetic section, the halves of the housing being magnetically attracted to one another at facing edges thereof, the halves of the housing have flanges extending radially and parallel to the flowpath, the halves being disposed in surface contact at the flanges, whereby the magnets are positioned opposite one another on the non-ferromagnetic section of the conduit and magnetic flux is confined to the housing and to the flowpath.

12. The fluid treatment device of claim 11, further comprising a non-ferromagnetic support for said magnets, the support having on opposite sides of the support a contour complementary to the magnets and a contour complementary to the non-ferromagnetic section of the conduit.

13. The fluid treatment device of claim 11, wherein the magnets have a flux density of at least 4,000 gauss at a pole face thereof.

14. The fluid treatment device of claim 11, wherein the wings of the housing halves extend outwardly at an obtuse angle relative to the bottom section, whereby the flanges on the wings are spaced from the non-ferromagnetic section of the conduit.

* * * * *